US00RE39514E

(19) United States
(12) Reissued Patent
Shemla et al.

(10) Patent Number: US RE39,514 E
(45) Date of Reissued Patent: *Mar. 13, 2007

(54) SWITCHING ETHERNET CONTROLLER

(75) Inventors: David Shemla, Kfar Havradim (IL); Avigdor Willenz, Kamoon (IL)

(73) Assignee: Marvell Semiconductor International Ltd., Yokneam (IL)

( * ) Notice: This patent is subject to a terminal disclaimer.

(21) Appl. No.: 10/872,147

(22) Filed: Jun. 21, 2004

Related U.S. Patent Documents

Reissue of:
(64) Patent No.: 5,923,660
Issued: Jul. 13, 1999
Appl. No.: 08/790,155
Filed: Jan. 28, 1997

U.S. Applications:
(63) Continuation of application No. 09/903,808, filed on Jul. 12, 2001.

(30) Foreign Application Priority Data

Jan. 31, 1996 (IL) ..... 116989

(51) Int. Cl.
*H04L 12/28* (2006.01)
*H04L 12/56* (2006.01)

(52) U.S. Cl. ..... 370/402; 709/238; 711/216; 370/389; 370/412; 370/401

(58) Field of Classification Search ..... 370/389, 370/401, 402, 392, 412, 428, 352–356, 400, 370/252, 238; 709/250, 238–244; 711/216, 711/201

See application file for complete search history.

(56) References Cited

U.S. PATENT DOCUMENTS 4,464,713 A * 8/1984 Benhase et al. ..... 711/205
4,663,706 A * 5/1987 Allen et al. ..... 709/234
4,680,700 A 7/1987 Hester et al. ..... 711/206

(Continued)

OTHER PUBLICATIONS

Ralston and Reilly, Encyclopedia of Computer Science, (third edition), pp. 1185–11911, 1995.*
Dr. Dobb's Journal, "Essential Books on Algorithms and Data Structures", CD–Rom Library, Section 9.31 and 9.34, 1995.*

(Continued)

*Primary Examiner*—John Pezzlo

(57) ABSTRACT

An Ethernet controller, for use within an Ethernet network of other Ethernet controller connected together by a bus, is provided. The Ethernet controller includes a plurality of ports including at least one bus port associated with ports connected to other switching Ethernet controllers, a hash table for storing addresses of ports within the Ethernet network, a hash table address control, a storage buffer including a multiplicity of contiguous buffers in which to temporarily store said packet, an empty list including a multiplicity of single bit buffers, a packet storage manager, a packet transfer manager and a write-only bus communication unit. The hash table address control hashes the address of a packet to initial hash table location values, changes the hash table location values by a fixed jump amount if the address values stored in the initial hash table location do not match the received address, and provides at least an output port number of the port associated with the received address. The packet storage manager associates the state of the bit of a single bit buffer with the empty or full state of an associated contiguous buffer and generates the address of a contiguous buffer. The packet transfer manager directs the temporarily stored packet to the port determined by said hash table control unit. The write-only bus communication unit is activated by the packet transfer manager, for transferring the packet out of the bus port by utilizing the bus for write only operations.

26 Claims, 10 Drawing Sheets

U.S. PATENT DOCUMENTS 4,996,663 A * 2/1991 Nemes ..... 707/200
5,005,121 A 4/1991 Nakada et al. ..... 710/26
5,032,987 A * 7/1991 Broder et al. ..... 711/221
5,101,348 A * 3/1992 Arrowood et al. ..... 709/242
5,222,064 A * 6/1993 Sagawa ..... 370/401
5,226,039 A 7/1993 Frank et al. ..... 370/405
5,274,631 A * 12/1993 Bhardwaj ..... 370/401
5,287,499 A * 2/1994 Nemes ..... 707/2
5,307,464 A 4/1994 Akao et al. ..... 715/810
5,351,299 A 9/1994 Matsuzaki et al. ..... 380/37
5,412,805 A * 5/1995 Jordan et al. ..... 707/101
5,414,704 A * 5/1995 Spinney ..... 370/389
5,440,552 A * 8/1995 Sugita ..... 370/395.54
5,479,628 A 12/1995 Olsen et al. ..... 711/206
5,521,913 A * 5/1996 Gridley ..... 370/389
5,563,950 A 10/1996 Easter et al. ..... 713/191
5,581,757 A * 12/1996 Maxey ..... 707/10
5,590,320 A 12/1996 Maxey ..... 707/203
5,623,644 A 4/1997 Self et al. ..... 713/503
5,632,021 A * 5/1997 Jennings et al. ..... 720/312
5,633,858 A * 5/1997 Chang et al. ..... 370/255
5,634,138 A * 5/1997 Ananthan et al. ..... 710/21
5,649,141 A * 7/1997 Yamazaki ..... 711/206
5,664,224 A 9/1997 Davis ..... 710/22
5,671,357 A * 9/1997 Humblet et al. ..... 709/242
5,715,395 A * 2/1998 Brabson et al. ..... 709/226
5,724,529 A * 3/1998 Smith et al. ..... 710/1
5,734,824 A * 3/1998 Choi ..... 709/224
5,740,175 A 4/1998 Wakeman et al. ..... 370/422
5,740,468 A * 4/1998 Hirose ..... 710/57
5,754,791 A * 5/1998 Dahlgren et al. ..... 709/242
5,761,431 A * 6/1998 Gross ..... 709/225
5,764,895 A * 6/1998 Chung ..... 709/250
5,764,996 A * 6/1998 Armstrong et al. ..... 710/260
5,781,549 A * 7/1998 Dai ..... 370/398
5,784,373 A * 7/1998 Satake et al. ..... 370/402
5,852,607 A 12/1998 Chin ..... 370/401
5,860,136 A * 1/1999 Fenner ..... 711/201
5,914,938 A 6/1999 Brady et al. ..... 370/254
5,930,261 A 7/1999 Shemla et al. ..... 370/428
5,946,679 A 8/1999 Ahuja et al. ..... 707/3
5,948,069 A 9/1999 Kitai et al. ..... 709/240
5,999,981 A 12/1999 Willenz et al. ..... 709/238
6,084,877 A 7/2000 Egbert et al. ..... 370/389
6,223,270 B1 4/2001 Chesson et al. ..... 711/202
6,240,065 B1 5/2001 Medina et al. ..... 370/229
6,292,483 B1 9/2001 Kerstein ..... 370/389

OTHER PUBLICATIONS

Black's Law Dictionary, http://weblinks.westlaw.com/Search/defa...=ptoblcaks%2D1001&RS=WEBL1%2EO&VR=1%2EO, West 2002, pp. 1–3.

G. Hicks, User FTP Documentation, RFC412, Nov. 27, 1972, pp. 1–7.

K. Abe, Y. Lacroix, L. Bonnell, and Z. Jakubczyk, "Modal Interference in a Short Fiber Section: Fiber Length, Splice Loss, Cutoff, and Wavelength Dependences," Journal of Lightwave Technology, vol. 10, No. 4, Apr. 1992, pp. 401–406.

* cited by examiner

SWITCHING ETHERNET CONTROLLER

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 5,923,660. The reissue applications are U.S. application Nos. 09/903,808, filed Jul. 12, 2001, and the present application. The present application, filed Jun. 18, 2004, is a continuation reissue of 09/903,808.*

FIELD OF THE INVENTION

The present invention relates to network switches generally and to switching Ethernet controllers in particular.

BACKGROUND OF THE INVENTION

A network switch creates a network among a plurality of end nodes, such as workstations, and other network switches connected thereto. Each end node is connected to one port of the network. The ports also serve to connect network switches together.

Each end node sends packets of data to the network switch which the switch then routes either to another of the end nodes connected thereto or to a network switch to which the destination end node is connected. In the latter case, the receiving network switch routes the packet to the destination end node.

Each network switch has to temporarily store the packets of data which it receives from the units (end node or network switch) connected to it while the switch determines how, when and through which port to retransmit the packets. Each packet can be transmitted to only one destination address (a "unicast" packet) or to more than one unit (a "multicast" or "broadcast" packet). For multicast and broadcast packets, the switch typically stores the packet only once and transmits multiple copies of the packet to some (multicast) or all (broadcast) of its ports. Once the packet has been transmitted to all of its destinations, it can be removed from the memory or written over.

Switching Ethernet controllers are network switches that implement the Ethernet switching protocol. According to the protocol, the Ethernet network (cabling and Ethernet ports) operates at 10 Megabits per second. However, most switches do not operate at that speed, since they require longer than the 10 Mbps to process the incoming packets. Thus, their throughput is less than 10 Mbps. Switches which do operate at the desired speed are known as providing "full-wire" throughput.

SUMMARY OF THE PRESENT INVENTION

It is an object of the present invention to provide an improved switching Ethernet controller (SEC) which provides full-wire throughput.

The SEC of the present invention achieves the high-speed operation by utilizing a plurality of elements whose operations are faster than those of the prior art.

For example, in accordance with a preferred embodiment of the present invention, the communication between SECs attempts to utilize the bus as little as possible so that the bus will be available as soon as an SEC wants to utilize it. In accordance with the present invention, each SEC includes a write-only bus communication unit which transfers the packets out of the SEC by utilizing the bus only for write operations. Thus, packets enter each SEC by having been written therein from other SECs and not by reading them in, since read operations utilize the bus for significant amounts of time compared to write operations. Having the bus available generally whenever a SEC needs it helps to provide the full-wire throughput.

In addition, the address table controller operates with a hash table storing addresses of the ports within the Ethernet network. The controller hashes the address of a packet to an initial hash table location value and then accesses that table location. If the address stored at the table location matches that of the input address, the port information is retrieved. However, if the address stored at the table location is other than that of the input address, rather than reading a pointer to the next location where values corresponding to the same hashed address can be found (as in the prior art), the present invention changes the hash table location values by a fixed jump amount and reads the address stored at the next table address. Due to the fixed jump amount, the hash table controller of the present invention always knows what the next possible table location is.

A further speed increase is found in the accessing of the temporarily stored packets. In the present invention, the packets are stored in a storage buffer including a multiplicity of contiguous buffers. Associated with the buffers is an empty list including a multiplicity of single bit buffers. A packet storage manager associates the state of the bit of a single bit buffer with the empty or full state of an associated contiguous buffer and generates the address of a contiguous buffer through a simple function of the address or number of its associated single bit buffer. The simple function is typically a multiplication operation.

The present invention also incorporates a network of SECs interconnected with PCI busses.

Finally, there is provided, in accordance with a preferred embodiment of the present invention, an Ethernet network including a) at least two groups of network switches, b) at least two PCI switch busses, wherein each group of network switches is connected to one of the PCI busses, c) at least two PCI-to-PCI bridges, wherein each PCI-to-PCI bridge is connected to one of the PCI switch busses and d) at least one interconnection PCI bus to which the PCI-to-PCI bridges are connected.

BRIEF DESCRIPTION OF THE DRAWINGS

The present invention will be understood and appreciated more fully from the following detailed description taken in conjunction with the drawings in which.

DETAILED DESCRIPTION OF THE PRESENT INVENTION

Figure 1A:
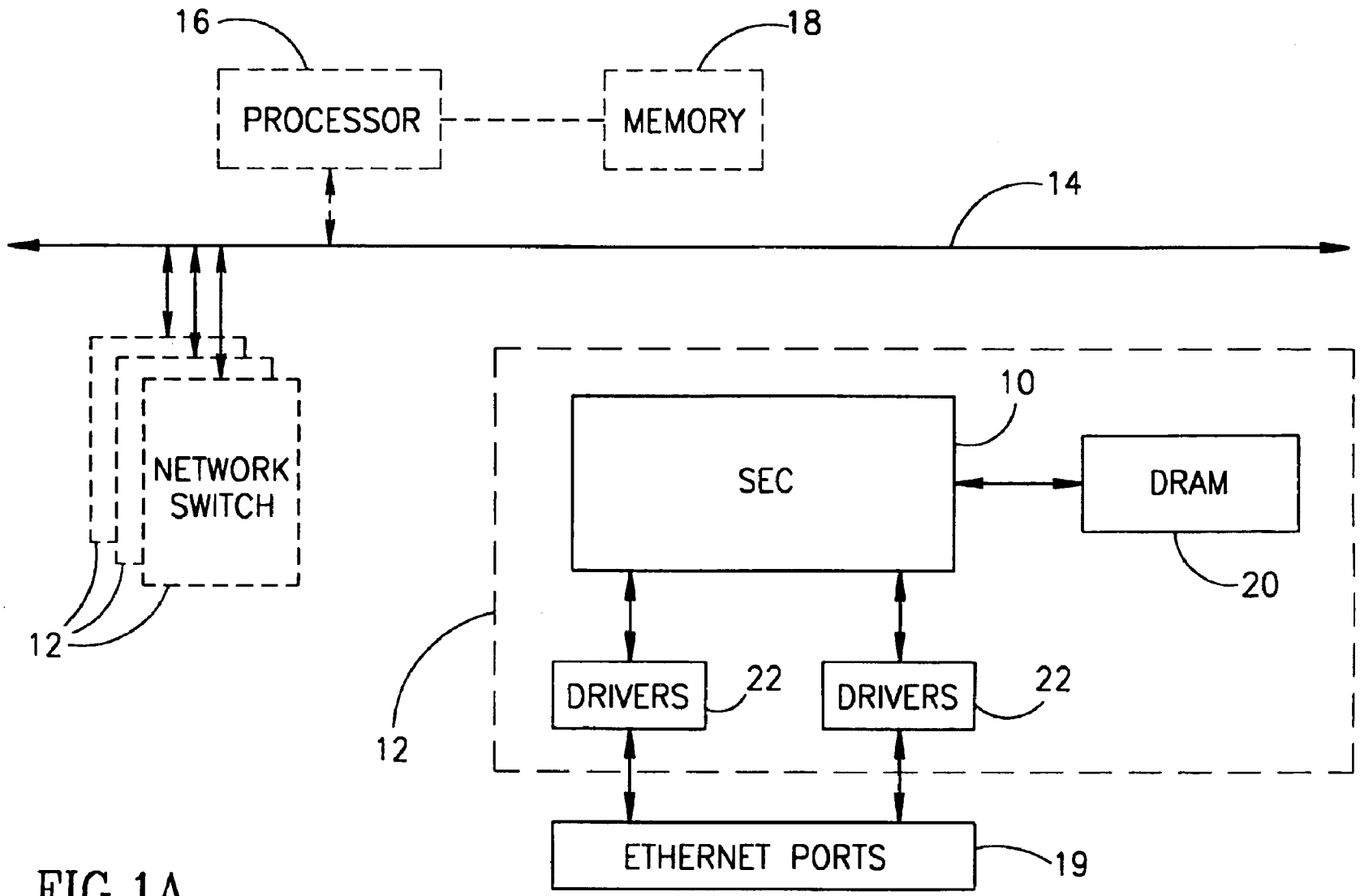
FIG. 1A is a schematic illustration of a network of switching Ethernet controllers.
Figure 1B:
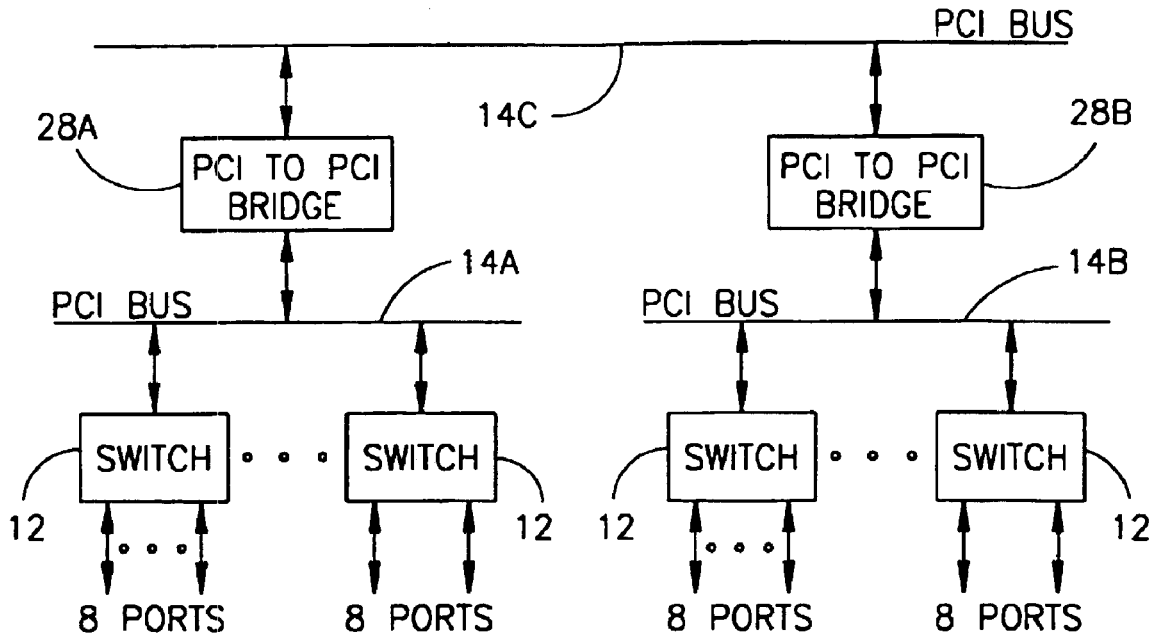
FIG. 1B is a schematic illustration of a network of switching Ethernet controllers interconnected by PCI busses.
Figure 2:
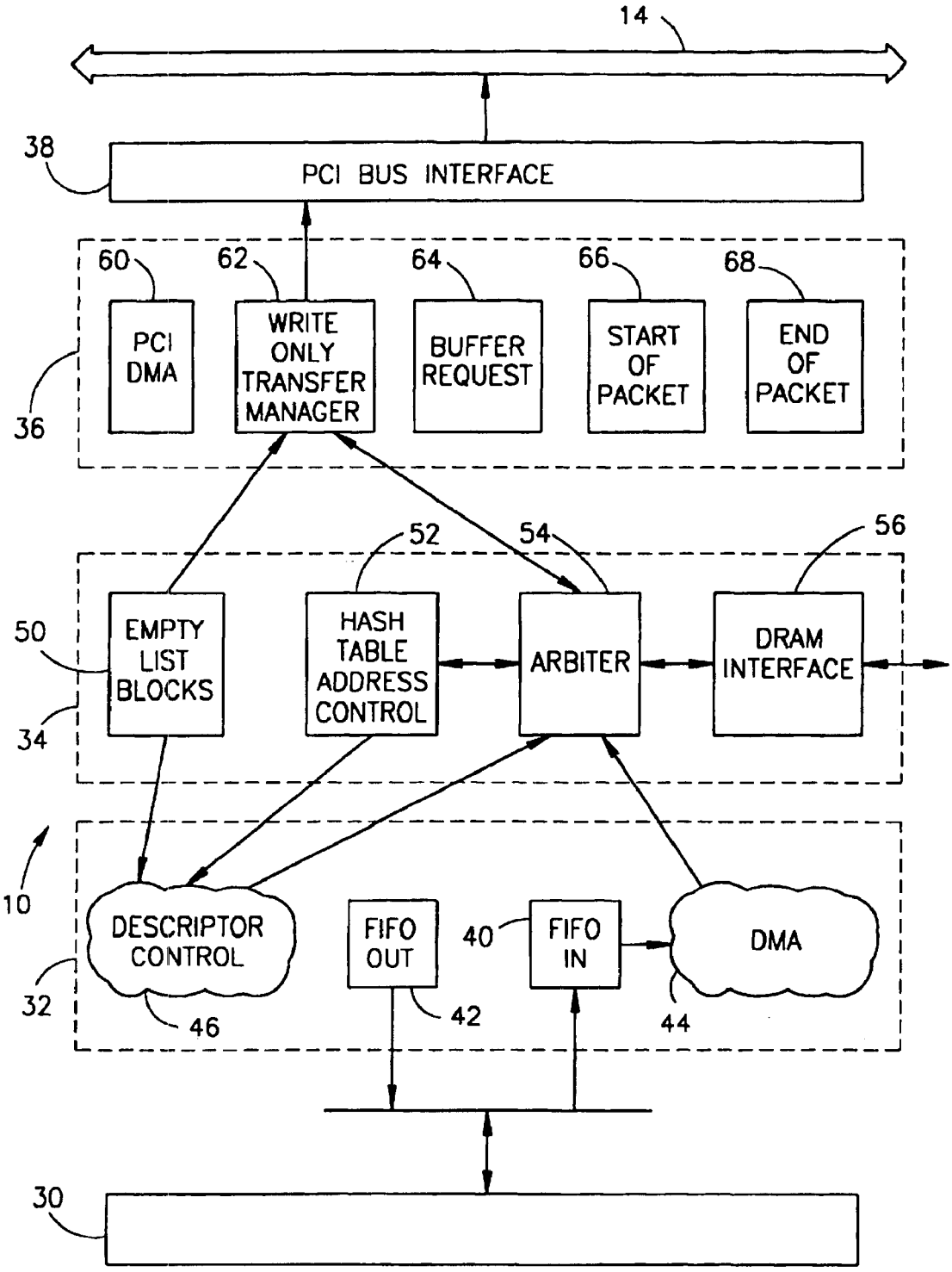
FIG. 2 is a block diagram illustration of a generally full-wire throughput, switching Ethernet controller, constructed and operative in accordance with a preferred embodiment of the present invention.

Reference is now made to FIGS. 1A, 1B and 2 which illustrate, in general terms, the generally full-wire throughput, switching Ethernet controller (SEC) 10 of the present invention and its connection within a network, wherein each SEC 10 forms part of a network switch 12.

FIG. 1A illustrates a plurality of network switches 12 connected as a peripheral component interface (PCI) bus, thereby to form a network. Optionally, a processor 16 and its associated memory unit 18 can also be connected to the bus 14.

FIG. 1A illustrates one network switch 12 in some detail. As shown, the switch 12 comprises a memory unit 20, such as a dynamic random access memory (DRAM) array, and a plurality of twisted pair drivers 22 for filtering data from an Ethernet unit 19 which implements a plurality of Ethernet ports. There typically is one twisted pair driver 22 per Ethernet port. The SECs 10 of each network switch typically provide the switching operations, switching data from port to port and from port to network switch, all in accordance with the switching information found in the headers of each data packet. The processor 16 can also be involved in the switching, as described in more detail hereinbelow.

FIG. 1B illustrates the interconnection of network switches 12 to create a large network or to enlarge an existing network. A plurality of network switches 12 are connected to PCI busses 14A and 14B. In FIG. 1B, PCI busses 14A and 14B are connected together via PCI bus 14C to which they are connected through PCI-to-PCI bridges 28A and 28B, respectively. Thus, two bus networks can be connected together through the addition of another PCI bus and two PCI-to-PCI bridges.

FIG. 2 details the elements of one SEC 10. It comprises an Ethernet interface unit 30, a frame control unit 32, a switching unit 34, an inter SEC control unit 36 and a bus interface unit 38. The Ethernet interface unit 30 performs the Ethernet protocol through which unit 30 communicates the packets to and from the other elements of the SEC 10. The frame control unit 32 directs the packet into and out of the DRAM memory unit 20, as per instructions of the switching unit 34, and provides the Ethernet header data to the switching unit 34. The switching unit 34 determines where to send each packet, either out one of its ports or out the bus 14 to another of the network switches. The inter SEC control unit 36 controls the communication with the bus 14. The bus interface unit 38 physically transfers packets to and from the bus 14. The two interface units 30 and 38 perform standard protocols (Ethernet and PCI bus, respectively) and therefore, will not be described hereinbelow in any detail.

The frame control unit 32 typically includes input and output multiple first-in, first-out (FIFO) buffers 40 and 42, respectively, a direct memory access (DMA) unit 44 and a descriptor control 46. The FIFO buffers 40 and 42 each have one FIFO buffer per port defined by the Ethernet interface unit 30. The descriptor control 46 controls 9 circular (or ring) transmit queues which are stored in the DRAM 20. Each queue lists the packets to be transmitted through one of the eight ports or through the PCI bus 14. The descriptor control 46 maintains read and write pointers for each queue so as to know which packets are still waiting to be transmitted.

For incoming packets, input FIFO buffer 40 receives and buffers packets from the ports. The DMA unit 44 transfers the currently available packet provided by the input FIFO buffer 40 to the DRAM 20 in accordance with the instructions from the switching unit 34. After the packet has been properly received, the switching unit 34 indicates to the descriptor control 46 through which port to transfer the packet. The descriptor control 46 places information about the packet into the relevant transmit queue and, when the packet rises to the top of the transmit queue, the descriptor control 46 indicates to the DMA 44 to transfer the packet from the DRAM 20 to the buffer in output FIFO 42 for the appropriate port.

The switching unit 34 typically includes an empty list block 50, a hash table address control unit 52, an arbiter 54 and a DRAM interface 56. The empty list block 50 manages the organization of the DRAM 20, noting which buffers of the DRAM 20 are available for storing newly arrived packets and which buffers contain packets to be transferred out. As will be described in more detail hereinbelow, the empty list block 50 associates an empty list of single bit buffers with the buffers of the DRAM 20. In addition, the empty list block 50 associates the state of the bit of a single bit buffer with the empty or full state of an associated DRAM buffer and generates the address of a DRAM buffer through a simple function of the address or number of its associated single bit buffer. The simple function is typically a multiplication operation. Thus, when a buffer request is received, the empty list block 50 relatively quickly can determine the address of the next available buffer.

When the empty list block 50 receives buffer assignment requests from the DMA 44 or from the inter SEC control unit 36, the empty list block 50 assigns the currently available buffer based on the state of the single bits of the empty list. Similarly, on output, when the empty list block 50 receives notification from the descriptor control 46 of the buffers which have successfully been either placed into the output FIFO 42 or transferred to another SEC (via the inter SEC control unit 36), the empty list block [40] *50* then updates the state of the associated single bit buffer.

The hash table address control unit 52 receives the source and destination address information of the packet header from the Ethernet interface unit 30. As will be described in more detail hereinbelow, control unit 52 operates in conjunction with a hash table (physically found in DRAM 20) of the possible addresses of the entire network. The control unit 52 hashes the address of a packet to an initial hash table location value and then accesses that table location. If the address stored at the table location matches that of the input address, the port information is retrieved. However, if the address stored at the table location is other than that of the input address, the present invention changes the hash table location values by a fixed jump amount and reads the address stored at the next table address. Due to the fixed jump amount, the hash table controller of the present invention always knows what the next possible table location is for the current hash value and thus, can generally quickly move through the hash table to match the input address and to produce the associated port number.

Arbiter 54 controls the access to the DRAM 20 and DRAM interface 56 accesses the DRAM 20 for each piece of data (a packet or an address in the hash table) being stored or removed. Arbiter 54 receives DRAM access requests from the hash table control unit 52, the DMA unit 44, the descriptor control unit 46 and the inter SEC control unit 36.

The hash table control unit 52 provides the port associated with the destination address of the incoming packet to the descriptor control 46. Similarly, the empty list block 50 provides the descriptor control 46 with the buffer number in which the incoming packet is stored. When both values are received and the packet has been properly received (that is, without any corrupted data), the descriptor control 46 places the received buffer information in the transmit queue for the received buffer number and, at the appropriate moment, initiates the transfer of the packet from the DRAM 20 into the queue of output FIFO 42 for the appropriate port. A slightly different operation occurs for the PCI transmit queue, as will be described hereinbelow.

The inter SEC control unit 36 typically includes a PCI DMA 60, a write-only transfer manager 62 and three interrupt registers, buffer request register 64, start of packet register 66 and end of packet register 68. The transfer manager 62 supervises the transfer protocol which, in accordance with a preferred embodiment of the present invention, is performed with only write operations. As discussed hereinabove, write operations utilize the bus 14 for relatively short periods of time only.

The descriptor control 46 activates the write only transfer manager 62 whenever there is buffer information in the PCI transmit queue for a packet which has not been transmitted. The descriptor control 46 provides the transfer manager 62 with the buffer address of the packet to be transferred and the port number of the destination SEC 10 to which the destination end node is attached.

To begin the transfer, the transfer manager 62 first prepares a "buffer request" message and writes the message into the buffer request register 64 of the destination SEC 10. Typically the buffer request includes at least the address of the buffer storing the packet to be transferred and the port number of the destination SEC 10 to which the destination end node is attached.

The presence of a message in register 64 causes the transfer manager 62 of the destination SEC 10 to request that the empty list block 50 allocate a buffer in the DRAM 20 for the packet to be transferred. The empty list block 50 reviews its empty list (without reading anything from the DRAM 20) and allocates the next available buffer (by changing the state of the bit associated with the buffer) to the packet to be transferred. The empty list block 50 provides the address of the allocated buffer to the transfer manager 62 which prepares a "start of packet" message with the address of the allocated buffer. The transfer manager 62 of the destination SEC 10 then writes the "start of packet" message to the start of packet register 66 of the source SEC 10. Typically, the "start of packet" message includes at least the address of the allocated buffer (in the destination SEC 10), the address of the buffer (in the source SEC 10) storing the packet to be transferred and the port number of the destination end node.

The presence of a message in the start of packet register 66 causes the transfer manager 62, of the source SEC 10, to activate the PCI DMA 60 to write the contents of the buffer storing the packet to be transferred in the allocated buffer in the destination SEC 10. The PCI DMA 60 of the source SEC 10 actually writes the packet to the PCI DMA 60 of the destination SEC 10 which, in turn, writes the transferred packet to the allocated buffer of its DRAM 20 after receiving permission from its arbiter 54. The transfer manager 62 also prepares an "end of packet" message and then writes the message into the end of packet register 68 once the packet to be transferred has been successfully transferred. Finally, the transfer manager 62 indicates to the empty list block 50 to clear the bit of the empty list which is associated with the transferred packet. The "end of packet" message includes at least the destination port number.

The transfer manager 62 of the destination SEC 10 responds to the "end of packet" message by providing its descriptor control 46 with the port and buffer numbers of the transferred packet. The descriptor control 46 then adds the buffer information to the transmit queue for the indicated port. The packet is then transferred to the port as described hereinabove.

The following describe the empty list block 50, the hash table control unit 52 and the write-only transfer protocol in more detail.

Empty List Block 50

Figure 3:
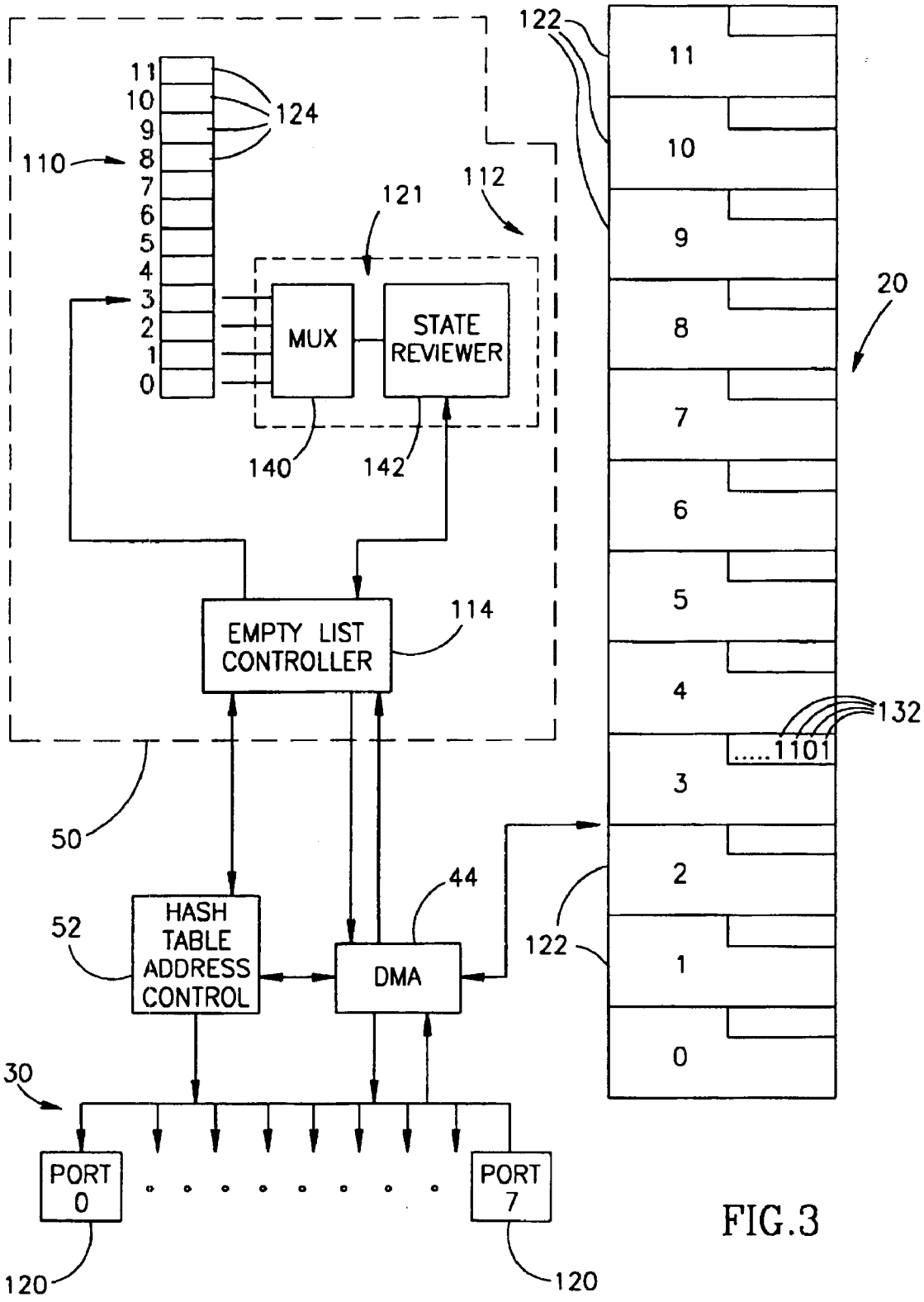
FIG. 3 is a schematic illustration of [a] *an* empty list block unit forming part of the switching Ethernet controller of FIG. 2.

Reference is now made to FIG. 3 which schematically illustrates the empty list block 50 and its operation with the other elements of the SEC 10. Block 50 comprises an empty list 110 and its associated multiple buffer 112 (stored in DRAM 20), an empty list controller 114 and a bit clearing mechanism 121. FIG. 3 also shows the ports 120 (of Ethernet unit 30) to and from which the packets of data pass, DMA 44 and hash table address control 52.

In accordance with the present invention, the buffer 112 comprises a multiplicity of contiguous buffers 122, each of M bits and large enough to store, for example, at least one packet of 1518 bytes. For example, M might be 1.5K or 1536 bytes. Alternatively, each buffer 122 might hold many packets.

Furthermore, in accordance with a preferred embodiment of the present invention, the empty list 110 is a buffer of single (0 or 1) bits 124, each associated with one of the buffers 122. FIG. 3 shows 12 of each of buffers 122 and single bit buffers 124; typically, there will be 1024 or more of each of buffers 122 and single bit buffers 124.

Buffers 124 store the value of 1 when their associated buffer 122 stores a not-yet retransmitted packet and a 0 when their associated buffer 122 is free to be written into. The buffers 122 and bits 124 are associated as follows: the address of the beginning of a buffer 122 is M times the address (or number) of the single bit buffer 124 associated therewith. In other words, for M=1.5K, the buffer 122 labeled 3 begins at address 4.5K and the buffer 122 labeled 0 begins at address 0. Alternatively, the first buffer 122 can begin at an offset K and thus, the address of the beginning of a buffer i is M times the address of the single bit buffer 124 associated therewith plus the offset K.

The empty list block 50 operates as follows: when a port 120 provides a packet, the DMA 44 requests the number of the next available buffer 122 from the empty list controller 114. Empty list controller 114 reviews the empty list 110 for the next available single bit buffer 124 whose bit has a 0 value. Empty list controller 114 then changes the bit value to 1, multiplies the address of next available buffer 124 by M (and adds an offset K if there is one) and provides the resultant address, which is the start location of the corresponding buffer 122, to DMA 44.

It will be appreciated that the empty list block 50 provides a very simple mechanism by which to determine and store the address of the next available buffer 122. The mechanism only requires one multiplication operation to determine the address and the address value is stored as a single bit (the value of buffer 124), rather than as a multiple bit address.

DMA 44 then enters the data from the incoming packet into the selected buffer 122. Once DMA 44 has finished entering the data, it indicates such to the hash table address control unit 52 which in the meantime, has received the destination and source end node addresses from the Ethernet unit 30. Unit 52 determines through which port to retransmit the packet. Empty list controller 114 provides unit 52 with the number of the buffer 122 in which the packet is stored.

When a packet is to be retransmitted, the empty list controller 114 provides the DMA 44 with the buffer address for the packet and the hash table address control 52 provides the DMA 44 with the port number. DMA 44 reads the data from the buffer 122 and provides the packet to the FIFO buffer for the relevant port 120.

For unicast packets, once the DMA 44 has finished transmitting the data of the selected buffer 122, DMA 44 indicates such to empty list controller 114 and includes in the indication the beginning address of the selected buffer 122. Empty list controller 114 then determines the buffer number of the selected buffer 122 and changes the bit value of the associated single bit buffer 124 to 0, thereby indicating that the selected buffer 122 is now available.

Buffers 122 are larger by at least N bits than the maximum amount of data to be stored therein. N is the number of ports connected to the switch plus the number of switches connected to the current switch. For example, N might be 46. The extra bits, labeled 132, are utilized, for multicast packets, to indicate the multiple ports through which the packet has to be transmitted.

When the multicast packet enters the switch, DMA 44 sets all of the bits 132 (since multicast packets are to be sent to everyone). After the DMA 44 has transmitted a packet, whose port number it receives from the address control 52, the DMA 44 indicates such to the empty list controller 114. If the packet is a multicast packet, the address control unit 52 indicates to the empty list controller 114 to read the N bits [32] *132* to determine if any of them are set. If they are, empty list controller 114 indicates to DMA 44 to reset the bit associated with the port 120 through which the packet was sent. When the DMA 44 indicates that it has finished resetting the bit, the empty list controller 114 does not change the associated single bit buffer 124.

If the empty list controller 114 reads that only one bit is still set (i.e. the previous transmission was the last time the packet has to be transmitted), when the DMA 44 indicates that it has finished resetting the bit, the empty list controller 114 changes the bit value of the associated single bit buffer 124 to 0, thereby indicating that the associated buffer 122 is now available.

In the empty list 110, bits typically change as data is received and transmitted. However, it is possible for data not to be transmitted if there are some errors in the network, such as a port being broken or a switch being removed from the network. In any of these cases, the bits in the empty list 110 associated with those ports must be cleared or else the associated buffers 122 will never be rewritten.

Therefore, the present invention includes bit clearing mechanism 121 which reviews the activity of the bits in the single bit buffers 124 and clears any set bits (i.e. of value 1) which have not changed during a predetermined period T. The period T is typically set to be small enough to avoid wasting storage space for too long but large enough to avoid clearing a buffer before its turn for transmission has occurred.

Bit clearing mechanism 121 comprises a multiplexer 140 and a state reviewer 142. The multiplexer 140 connects, at one time, to a group of single bit buffers 124 and switches between groups of buffers every period T. State reviewer 142 reviews the state of the group of single bit buffers 124 to determine if all of the single bit buffers 124 changed from 1 to 0 at least once during the period T. If, at the end of period T, one or more bits in buffers 124 have remained in the set state (i.e. with value 1), the state reviewer 142 clears them to 0. Multiplexer 140 then connects to the next group of single bit buffers 124.

Figure 4:
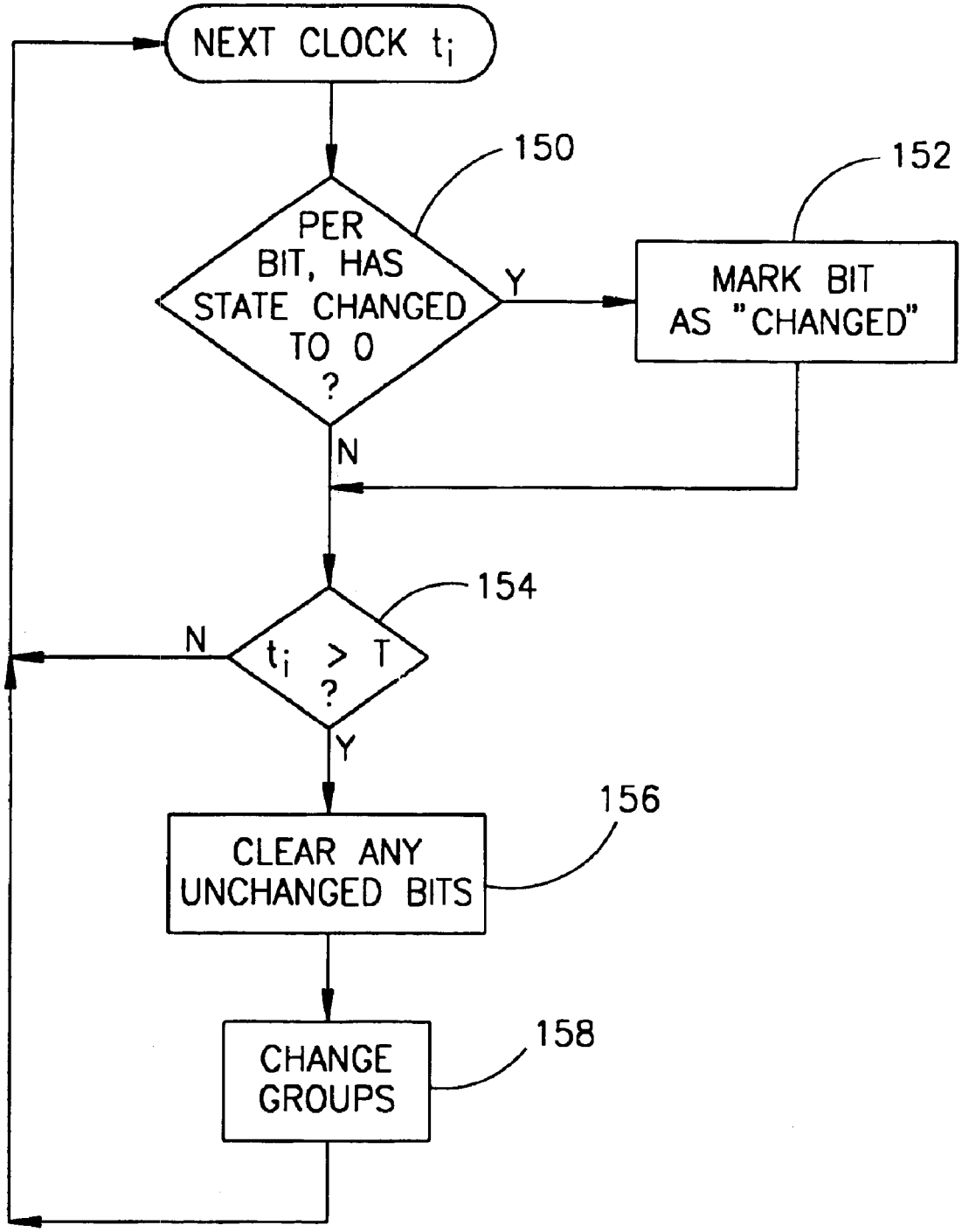
FIG. 4 is a flow chart illustration of a bit clearing mechanism forming part of the empty list block unit of FIG. 3.

The operations of the bit clearing mechanism 121 are detailed in FIG. 4. Specifically, at each clock tick $t_i$, the state reviewer 142 checks [(step 50)] (*step 150*) each bit. If the bit has changed to 0, the bit is marked (step 152) as "changed". Otherwise, nothing occurs. The process is repeated until the period T has ended (step 154).

At the end of the period T, the state reviewer 142 clears (step 156) any unchanged bits and the multiplexer 140 changes (step 158) the group. The process is repeated for the next time period T.

Hash Table Control Unit 52

Figure 5:
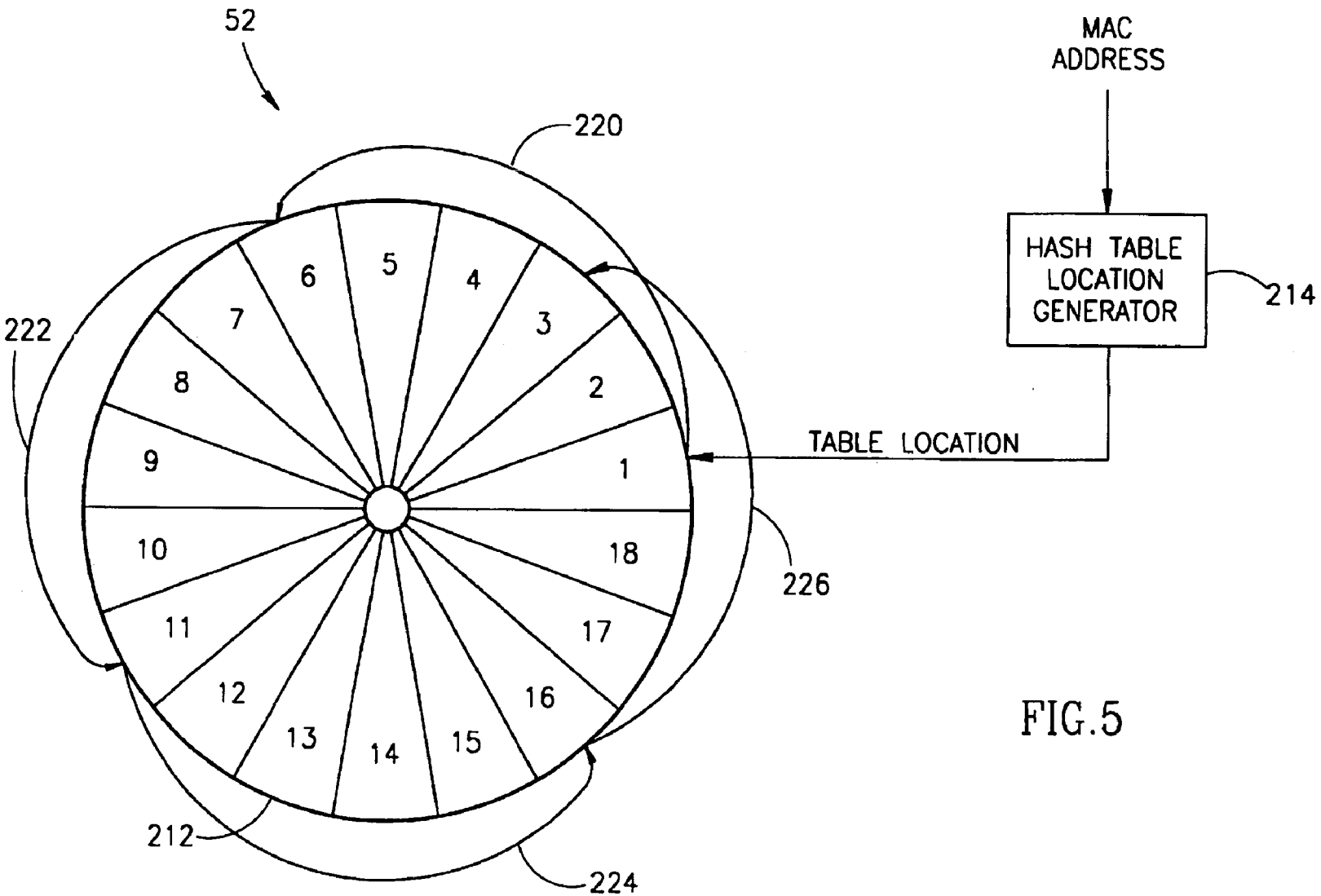
FIG. 5 is a schematic illustration of a hash table address recognition unit, constructed and operative in accordance with a preferred embodiment of the present invention.
Figure 6:
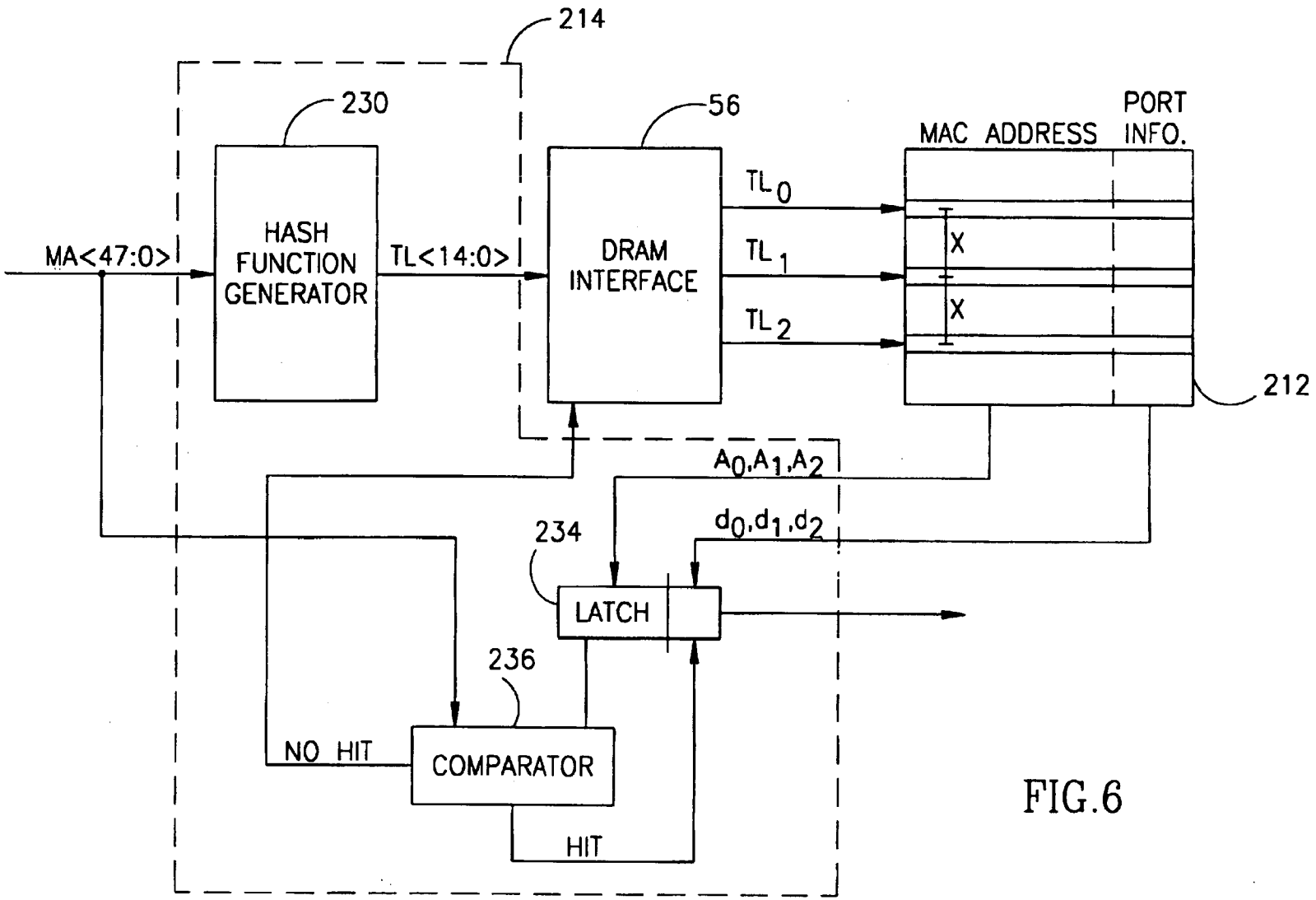
FIG. 6 is a block diagram illustration of the logic elements of the address recognition unit of FIG. 3.

Reference is now made to FIGS. 5 and 6 which illustrate the hash table control unit 52 of the present invention. FIG. 5 illustrates the hash table control unit 52 and its operation and FIG. 6 details the elements of unit 52. The term "address" will be used herein to refer to MAC addresses and the term "location" will be utilized to refer to addresses within the hash table 212.

Hash table control unit 52 comprises a hash table 212 and a hash table location generator 214. Hash table 212 is shown with only 18 locations; it will be appreciated that this is for the purposes of clarity only. Typically, hash table 212 will have 32K locations therein and, in accordance with the present invention, stores only the MAC address and the port associated therewith.

Location generator 214 receives the MAC address, whether of the source end node or of the destination end node, and transforms that address, via a hash function, to a table location. The hash function can be any suitable hash function; one suitable function is provided hereinbelow with respect to FIG. 7.

In accordance with the present invention, if the generated table location stores an address which is not the same as the input MAC address, the location generator 214 generates a second location which is X locations further down in the hash table 212. The hash table does not store any pointers to the next location. In accordance with the present invention, X is a prime number such that, if it is necessary to move through the entire hash table 212, each location will be visited only once during the review.

For example, and as shown in FIG. 5, X is 5 and the first table location is the location labeled 1. If the MAC address of location 2 does not match that of the input MAC address, the location generator 214 "jumps" to location 6 (as indicated by arrow 220), and then to location 11 (arrow 222), and then to location 16 of the hash table 212 (arrow 224). Since there are only 18 locations in the hash table 212 of FIG. 5, location generator 214 then jumps to location 3 (arrow 226) which is (16+5) mod 18. If location 4 is also full, location generator 214 will generate locations until all of the locations of table 212 have been visited.

It will be appreciated that the hash table control unit 52 does not need to have pointers in table 212 pointing to the "next" location in the table. As a result, unit 52 knows, a priori, which locations in the table are next and can, accordingly, generate a group of locations upon receiving the MAC address. If desired, the data in the group of locations can be read at once and readily compared to the input MAC address.

FIG. 6 illustrates the elements of the location generator 214 and its operation in conjunction with the table 212. Location generator 214 comprises a hash function generator 230, DRAM interface 56 (since the hash table 212 is typically implemented in DRAM 20), a latch 234 and a comparator 236.

The hash function generator 230 converts the MAC address MA, of 48 bits, to the table location $TL_0$, of 15 bits. The DRAM interface 56 generates the group of next table locations $TL_0$, $TL_1$ and $TL_2$, where $TL_1=TL_0+X$ and $TL_2=TL_0+2X$, etc. It will be appreciated that FIG. 6 illustrates only three table locations but many more or many less can be generated at once, as desired.

DRAM interface 56 accesses the table 212 to read the addresses $A_0$, $A_1$ and $A_2$, and their associated data $d_0$, $d_1$ and $d_2$, stored in table locations $TL_0$, $TL_1$ and $TL_2$, respectively. The data $d_i$ include the necessary information about the address, such as the switch identification number and any other desired information. The read operation can be performed at once or successively.

The output of each table location is latched by latch 234. Comparator 236 then compares the address information $A_i$ with that of MAC address MA. If the two addresses match (i.e. a "hit"), then comparator 236 indicates to latch 234 to output the associated d $d_i$ stored therein. Otherwise, comparator 236 indicates to DRAM interface 56 to read the address $A_i$ and associated data $d_i$ stored in the next table location.

If many table locations are to be read at once, the location generator 214 can include a multiplicity of latches 234, one for each location to be read at once.

If one of the table locations is empty, as indicated by a valid bit of the data $d_i$, all locations after it will also be empty. Thus, the input MAC address has no corresponding stored address and therefore, the input MAC address is typically input into the empty table location. The valid bit in the associated data $d_i$ is then set to 'not empty'.

Figure 7:
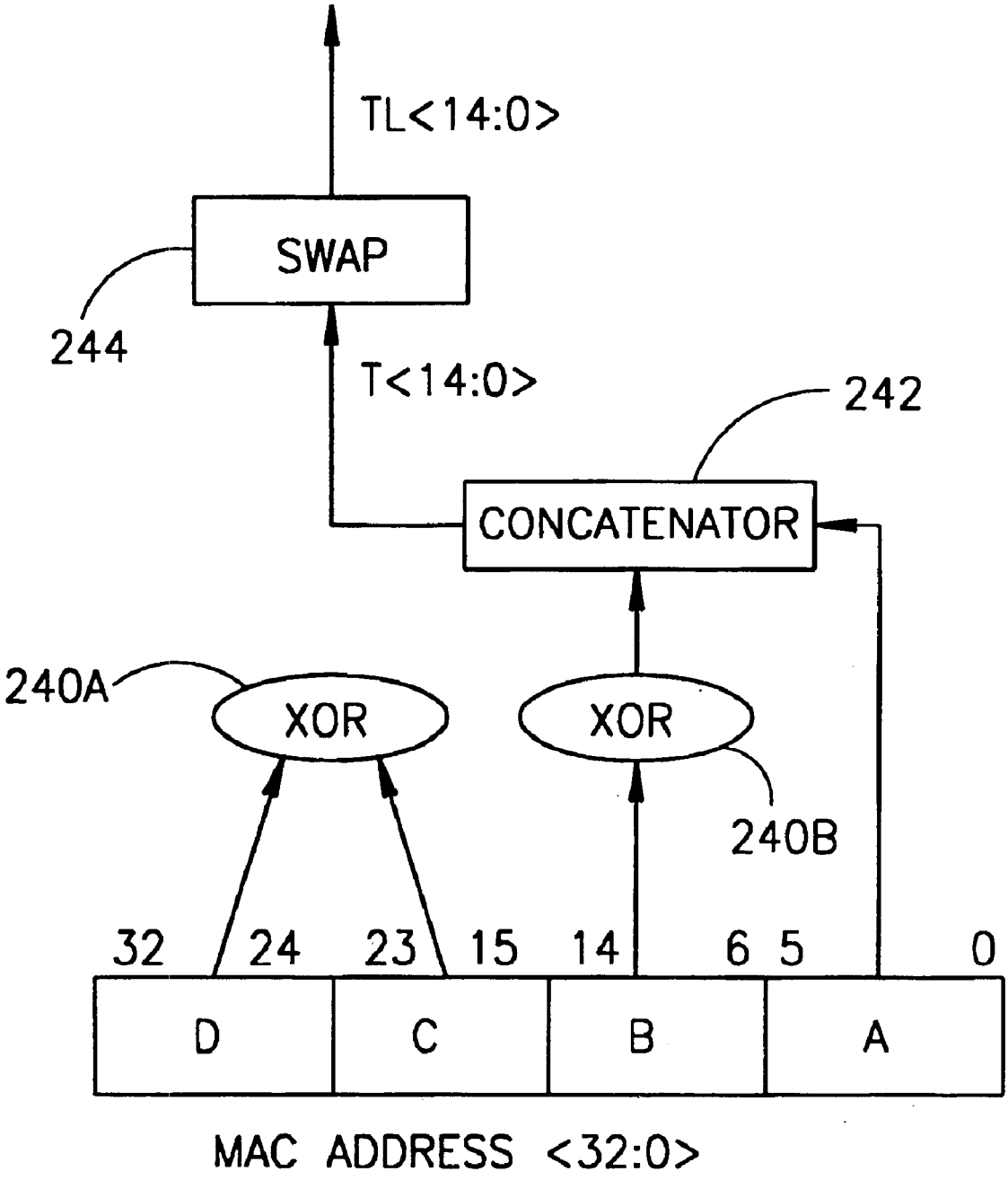
FIG. 7 is a schematic diagram of a hash function, useful in the address recognition unit of FIG. 3.

FIG. 7, to which reference is now made, illustrates an exemplary hash function, for typical MAC addresses, which can be performed by hash function generator 230. In this embodiment, generator 230 considers only the 33 lowest significant bits (LSBS) of the MAC address. The 33 LSBs are divided into four bytes, labeled A, B, C and D. Byte A consists of bits 0:5, byte B consists of bits 6:14, byte C consists of bits 15:23 and byte D consists of bits 24:32. Thus, byte A is 6 bits and the remaining bytes are 9 bits.

Hash function generator 230 comprises two XOR units 240A and 240B, a concatenator 242 and a swap unit 244. The XOR unit 240A performs an exclusive OR between bytes C and D and XOR unit 240B performs an exclusive OR between the output of XOR unit 240A and byte B. Concatenator 242 concatenates the output of XOR unit 240B with byte A, thereby producing variable T of 15 bits. Swap unit 244 swaps the bits of variable T to produce the output table location TL. Thus, the value of TL<14> receives the value of T<0>, the value of TL<13> receives that of T<1>, etc. It will be appreciated that any hash function can be utilized. However, the desired hash functions are those which provide a uniform distribution of table locations for the expected MAC addresses. It is noted that the above hash function is easily implemented in hardware since XOR units and concatenators are simple to implement.

Write-Only Transfer Manager 62

Figure 9B:
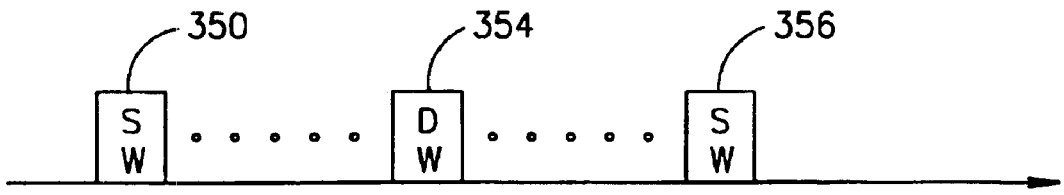
FIG. 9B is a timing diagram illustration of the activity of the bus during the operation of FIG. 9A.
Figure 8:
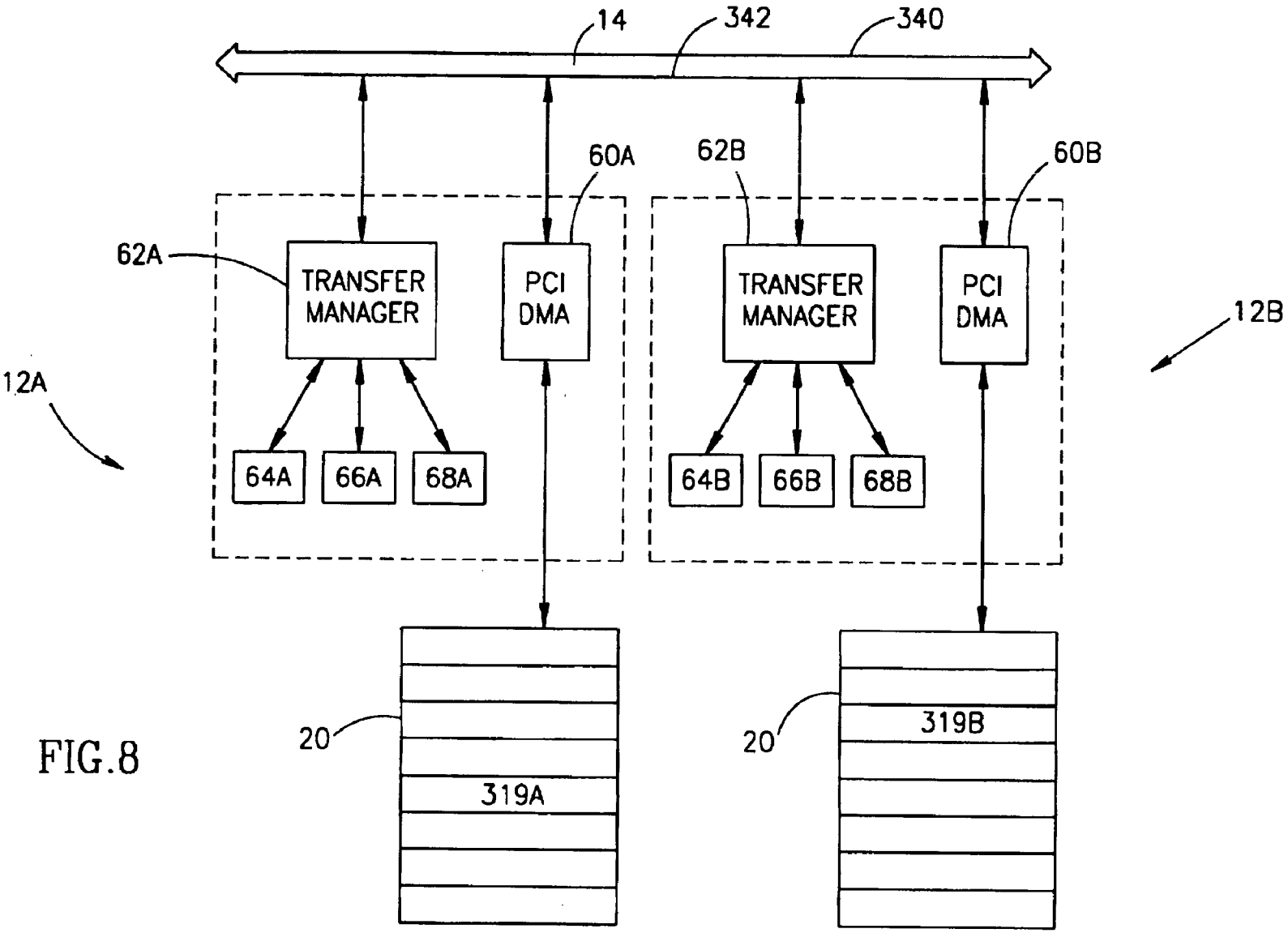
FIG. 8 is a schematic illustration of two network switches performing a write-only bus transfer protocol.
Figure 9A:
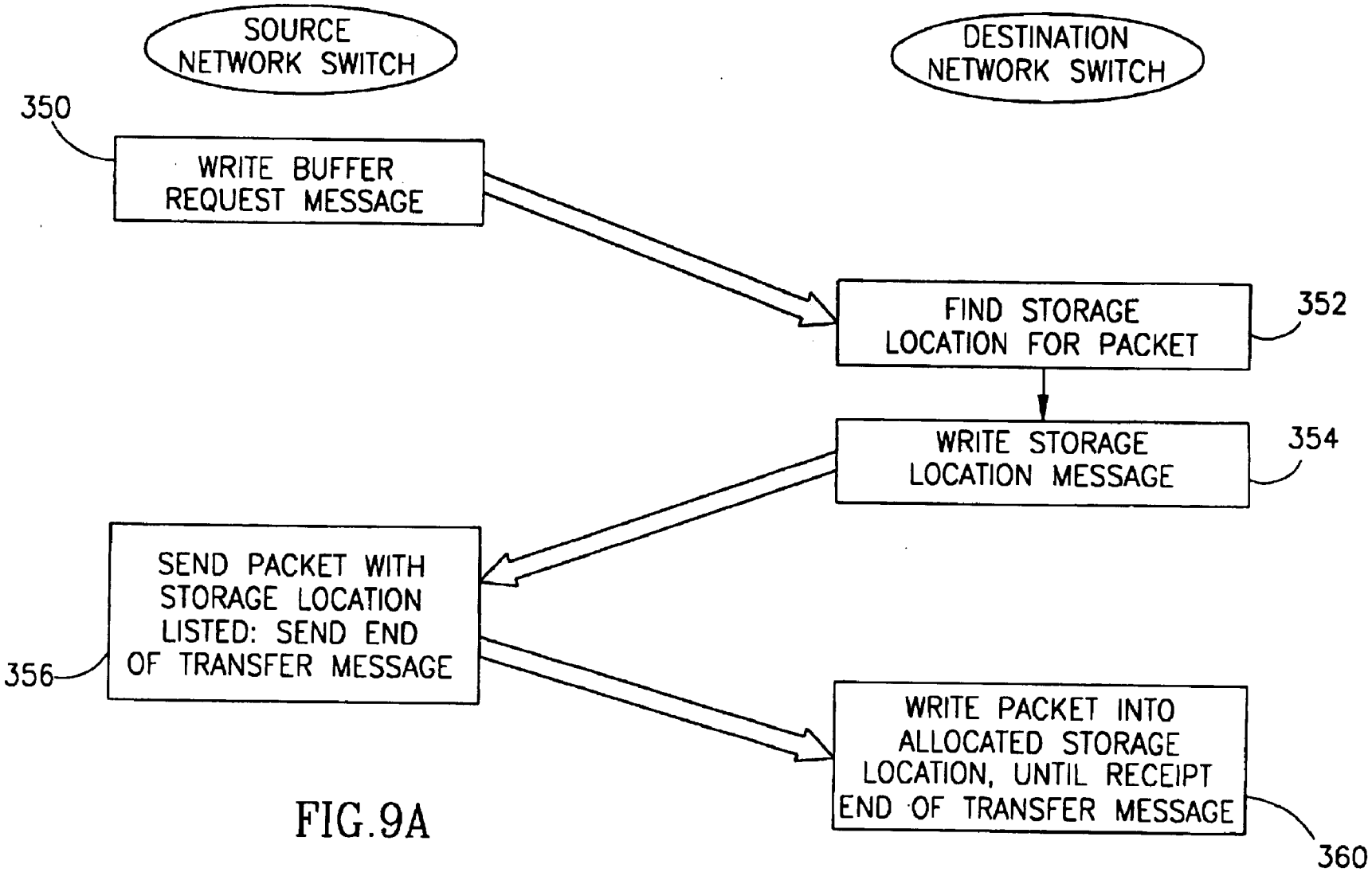
FIG. 9A is a flow chart illustration of the operations performed by the two switches of FIG. 8 during the data transfer operation of the present invention.

Reference is now made to FIG. 8 which illustrates the network configuration of the present invention and to FIGS. 9A and 9B which illustrate the data transfer operation of the present invention. Elements of FIG. 8 which are similar to those of FIG. 2 have the same reference numerals. It is noted that bus 14 has at least two lines, a data line 340 and an address line 342.

In accordance with the write-only protocol of the present invention, packets of data are not transferred until a buffer location 319 is allocated for them in the DRAM 20 of the destination network switch 12B. Furthermore, since the transfer operation is a DMA transfer, a packet is directly written into the location allocated therefor.

In accordance with a preferred embodiment of the present invention, when a packet of data is to be transferred, the source network switch 12A initially writes (step 350, FIG. 9A) a "buffer request" message to the buffer request register 64b of the destination network switch 12B. The buffer request message asks that the destination network switch allocate a buffer for the data to be transferred.

In the DMA transfer embodiment of the present invention, the source network switch 12A provides, on address line 342, the address of the "buffer request" register, the address of destination network switch 12B and its "return" address. Source network switch 12A provides, on data line 340, the size (or byte count) of the packet to be transferred and the buffer location 319A in which it is stored. The data of the data line is then written directly into the buffer request register.

In response to the buffer request message, the destination network switch 12B determines (step 352) the buffer location 319B in which the packet can be stored. It then writes (step 354) a "start of packet" message to the start of packet register 66a of the source network switch 12A which includes at least the location of the allocated buffer and the port numbers of the source and destination network switches. It can also include the byte count.

For example, in the DMA transfer embodiment of the present invention described hereinabove, the destination network switch 12B provides, on address line 342, the address of the "start of packet" register and the address of source network switch 12A. Destination network switch 12B provides, on data line 340, at least the following: the byte count of the packet to be transferred, the address 319B of the allocated buffer, the port number of the destination network switch 12B, and, for identification, the buffer location 319A in which the data is stored in the source network switch 12A and the port number of the source network switch 12A. As before, the data of the data line is then directly written into the start of packet register.

In response to receipt of the start of packet message in the start of packet register, the source network switch 12A writes (step 356) the packet of data to the allocated buffer location, followed by an "end of packet" message. Once the source network switch 12A has finished writing the end of packet message, it is free to send the next packet, beginning at step 350.

In the above described embodiment, the writing of the packet of data involves providing the address of the destination network switch 12B and the buffer location 319B on the address line 342 and the packet to be transferred on the data line 340. The transferred packet is then directly written into the allocated buffer location 319B. The end of packet message is written in a similar manner to the other messages, but to end of packet register 68b. The address information includes the address of the end of packet register and the address of the destination network switch 12B. The data includes the port number of the destination network switch 12B, the buffer location 319B and the byte count.

When the packet arrives at the destination network switch 12B it directly writes (step 360) the packet into the allocated buffer location 319B, as per the address on the address line 342, until it receives the end of packet message for that allocated buffer location. The destination network switch 12B is now free to perform other operations until it receives a next buffer allocation request.

FIG. 9B illustrates the timing of the packet transfer described in FIG. 9A. The initial source write operation of the buffer request message (step 350) is typically relatively short since write operations take relatively little time and since the message to be transferred is small. Some time later, there is a destination write (DW) operation of the start of packet message (step 354). The destination write operation takes approximately the same length of time as the first source write operation. Some time later, there is a further source write operation (step 356) of the packet transfer and end of packet message. Since, for this operation, there is more data to be transferred, this source write operation is shown to take a longer time than the other two write operations. The source and network switches are free to perform other operations after they finish their writing operations.

It is also noted that, in the present invention, the source network switch 12A is free to operate on other packets once it has finished writing its packet, and its associated end of packet message, to the bus. The source network switch 12A does not need to ensure that the destination network switch 12B has successfully received the packet since, in the present invention, the address for the data (in the destination network switch) is known and is fully allocated prior to sending the packet; the packet would not be sent if there was no buffer location available for it. In the present invention, the time it takes for the destination network switch 12B to process the packet is not relevant to the operation of the source network switch 12A.

It will be appreciated by persons skilled in the art that the present invention is not limited to what has been particularly shown and described hereinabove. Rather the scope of the present invention is defined by the claims which follow:

We claim:

[1. A generally full-wire throughput, switching Ethernet controller for use within an Ethernet network of other switching Ethernet controllers connected together by a bus, the controller comprising:

a. a plurality of ports including at least one bus port associated with ports connected to other switching Ethernet controllers;

b. a hash table for storing addresses of ports within said Ethernet network;

c. hash table address control for hashing the address of a packet to initial hash table location values, for changing the hash table location values by a fixed jump amount if the address values stored in said initial hash table location does not match the received address, and for providing at least an output port number of the port associated with the received address;

d. a storage buffer including a multiplicity of contiguous buffers in which to temporarily store said packet;

e. an empty list including a multiplicity of single bit buffers;

f. a packet storage manager for associating the state of the bit of a single bit buffer with the empty or full state of an associated contiguous buffer and for generating the address of a contiguous buffer through a simple function of the address or number of its associated single bit buffer;

g. a packet transfer manager for directing said temporarily stored packet to the port determined by said hash table control unit; and h. a write-only bus communication unit, activated by said packet transfer manager, for transferring said packet out said at least one bus port by utilizing said bus only for write operations.]

[2. A controller according to claim 1 and wherein said write-only bus communication unit includes a direct memory access controller.]

*3. A switching Ethernet controller, comprising:*

*a hash table,*

*wherein the hash table comprises a plurality of hash table locations to store destination addresses;*

*a hash table controller,*

*wherein the hash table controller is configured to hash a destination address from at least one packet, using a hash function, for comparison with the destination addresses stored in at least one of the plurality of hash table locations; and*

*a packet transfer manager,*

*wherein when a destination address stored in one of the plurality of hash table locations matches the destination address from the at least one packet, the packet transfer manager is configured to transfer the at least one packet from a source port to a destination port, and*

*wherein when the destination address stored in the one of the plurality of hash table locations does not match the destination address from the at least one packet, the hash table controller is configured to change an address generated from the hash function by a predetermined amount for lookup of a destination address stored in another one of the plurality of hash table locations.*

*4. The switching Ethernet controller of claim 3, further comprising:*

*a plurality of ports,*

*wherein the plurality of ports comprises:*

*(i) at least the source port configured to communicate with a source device, and*

*(ii) at least the destination port configured to communicate with a destination device,*

*wherein the source device includes a source address and the destination device includes a destination address, and*

*wherein the source device is configured to transmit the at least one packet to the destination device.*

*5. The switching Ethernet controller of claim 4, further comprising:*

*a memory,*

*wherein the memory includes a plurality of buffers, and*

*wherein each of the plurality of ports corresponds to a respective one of the plurality of buffers.*

*6. The switching Ethernet controller of claim 3, wherein the at least one packet comprises at least one of the destination address and a combination of the destination address and data.*

*7. The switching Ethernet controller of claim 3, wherein the predetermined amount comprises a prime number.*

*8. A switching Ethernet controller, comprising:*

*a plurality of hash table location means for storing destination addresses;*

*a hash table controller means for hashing a destination address from at least one packet, using a hash function, for comparison with the destination addresses stored in at least one of the plurality of hash table location means; and*

*means for transferring packets,*

*wherein when a destination address stored in one of the plurality of hash table, location means matches the destination address from the at least one packet, the means for transferring packets is configured to transfer the at least one packet from a source port means to a destination port means, and*

*wherein when the destination address stored in the one of the plurality of hash table location means does not match the destination address from the at least one packet, the hash table controller means is configured to change an address generated from the hash function by a predetermined amount for lookup of a destination address stored in another one of the plurality of hash table location means.*

*9. The switching Ethernet controller of claim 8, further comprising:*

*a plurality of port means for communicating information,*

*wherein the plurality of port means comprises:*

*(i) at least the source port means for communicating with a source means, and*

*(ii) at least the destination port means for communicating with a destination means,*

*wherein the source means includes a source address and the destination means includes a destination address, and*

*wherein the source means is configured to transmit the at least one packet to the destination means.*

*10. The switching Ethernet controller of claim 9, further comprising:*

*a plurality of buffer means for storing information,*

*wherein each of the plurality of port means corresponds to a respective one of the plurality of buffer means.*

*11. The switching Ethernet controller of claim 8, wherein the at least one packet comprises at least one of the destination address and a combination of the destination address and data.*

*12. The switching Ethernet controller of claim 8, wherein the predetermined amount comprises a prime number.*

*13. A switching Ethernet controller, comprising:*

*a hash table,*

*wherein the hash table comprises a plurality of hash table locations to store destination addresses; and*

*a hash table address controller,*

*wherein the hash table address controller is configured to hash a destination address from a packet, using a hash function, for comparison with the destination addresses stored in at least one of the plurality of hash table locations,*

*wherein when a destination address stored in one of the plurality of hash table locations matches the destination address from the packet, the hash table address controller is configured to provide information that causes the packet to be transmitted from a source port to a destination port, and*

*wherein when the destination address stored in the one of the plurality of hash table locations does not match the destination address from the packet, the hash table address controller is configured to change an address generated by the hash function by a predetermined amount for lookup of a destination address stored in another one of the plurality of hash table locations.*

*14. The switching Ethernet controller of claim 13, further comprising:*

*a plurality of ports,*

*wherein the plurality of ports comprises:*

*(i) at least the source port configured to communicate with a source device, and*

*(i) at least the destination port configured to communicate with a destination device,*

*wherein the source device includes a source address and the destination device includes a destination address,*

*wherein the source device is configured to transmit at least one packet to the destination device.*

*15. The switching Ethernet controller of claim 14, further comprising:*

*a memory,*

*wherein the memory includes a plurality of buffers, and*

*wherein each of the plurality of ports corresponds to a respective one of the plurality of buffers.*

*16. The switching Ethernet controller of claim 13, wherein the packet comprises at least one of the destination address and a combination of the destination address and data.*

*17. The switching Ethernet controller of claim 13, wherein the predetermined amount comprises a prime number.*

*18. The switching Ethernet controller of claim 13, further comprising:*

*a transfer manager,*

*wherein the transfer manager is configured to transfer the packet from the source port to the destination port in accordance with the hash table address controller.*

*19. The switching Ethernet controller of claim 13, wherein the hash table address controller is configured to compare the destination address from the packet with the destination addresses stored in at least two of the plurality of hash table locations.*

*20. The switching Ethernet controller of claim 19, wherein the hash table address controller is configured to compare the destination address from the packet with the destination addresses stored in at least two of the plurality of hash table locations by continuing to fetch additional destination addresses stored in the plurality of hash table locations, up to a second predetermined amount.*

*21. A switching Ethernet controller, comprising:*

*a plurality of hash table location means for storing destination addresses; and*

*a hash table address controller means for hashing a destination address from a packet, using a hash function, for comparison with the destination addresses stored in at least one of the plurality of hash table location means,*

*wherein when a destination address stored in one of the plurality of hash table location means matches the destination address from the packet, the hash table address controller means is configured to provide information that causes the packet to be transmitted from a source port means to a destination port means, and*

*wherein when the destination address stored in the one of the plurality of hash table location means does not match the destination address from the packet, the hash table address controller means is configured to change an address generated by the hash function by a predetermined amount for lookup of a destination address stored in another one of the plurality of hash table location means.*

*22. The switching Ethernet controller of claim 21, further comprising:*

*a plurality of port means for communicating information, wherein the plurality of port means comprises:*

*(i) at least the source port means for communicating with a source means, and*

*(ii) at least the destination port means for communicating with a destination means,*

*wherein the source means includes a source address and the destination means includes a destination address,*

*wherein the source means is configured to transmit at least one packet to the destination means.*

*23. The switching Ethernet controller of claim 22, further comprising:*

*a plurality of buffer means for storing information, wherein each of the plurality of port means corresponds to a respective one of the plurality of buffer means.*

*24. The switching Ethernet controller of claim 21, wherein the packet comprises at least one of the destination address and a combination of the destination address and data.*

*25. The switching Ethernet controller of claim 21, wherein the predetermined amount comprises a prime number.*

*26. The switching Ethernet controller of claim 21, further comprising:*

*a transfer manager means for transmitting the packet from the source port means to the destination port means in accordance with the hash table address controller means.*

*27. The switching Ethernet controller of claim 21, wherein the hash table address controller means is configured to compare the destination address from the packet with the destination addresses stored in at least two of the plurality of hash table location means.*

*28. The switching Ethernet controller of claim 27, wherein the hash table address controller means is configured to compare the destination address from the packet with the destination addresses stored in at least two of the plurality of hash table location means by continuing to fetch additional destination addresses stored in the plurality of hash table location means, up to a second predetermined amount.*

* * * * *

UNITED STATES PATENT AND TRADEMARK OFFICE

CERTIFICATE OF CORRECTION

PATENT NO. : RE 39,514 E
APPLICATION NO. : 10/872147
DATED : March 13, 2007
INVENTOR(S) : David Shemla et al.

It is certified that error appears in the above-identified patent and that said Letters Patent is hereby corrected as shown below:

| | |
|---|---|
| Column 13, Line 11 | Delete "," after "table" |
| Column 14, Line 13 | Delete "(i)" and insert -- (ii) -- |

Signed and Sealed this

Eleventh Day of March, 2008

JON W. DUDAS
*Director of the United States Patent and Trademark Office*